Feb. 18, 1936.  B. S. AIKMAN  2,030,955
BRAKE SYSTEM
Filed July 20, 1934
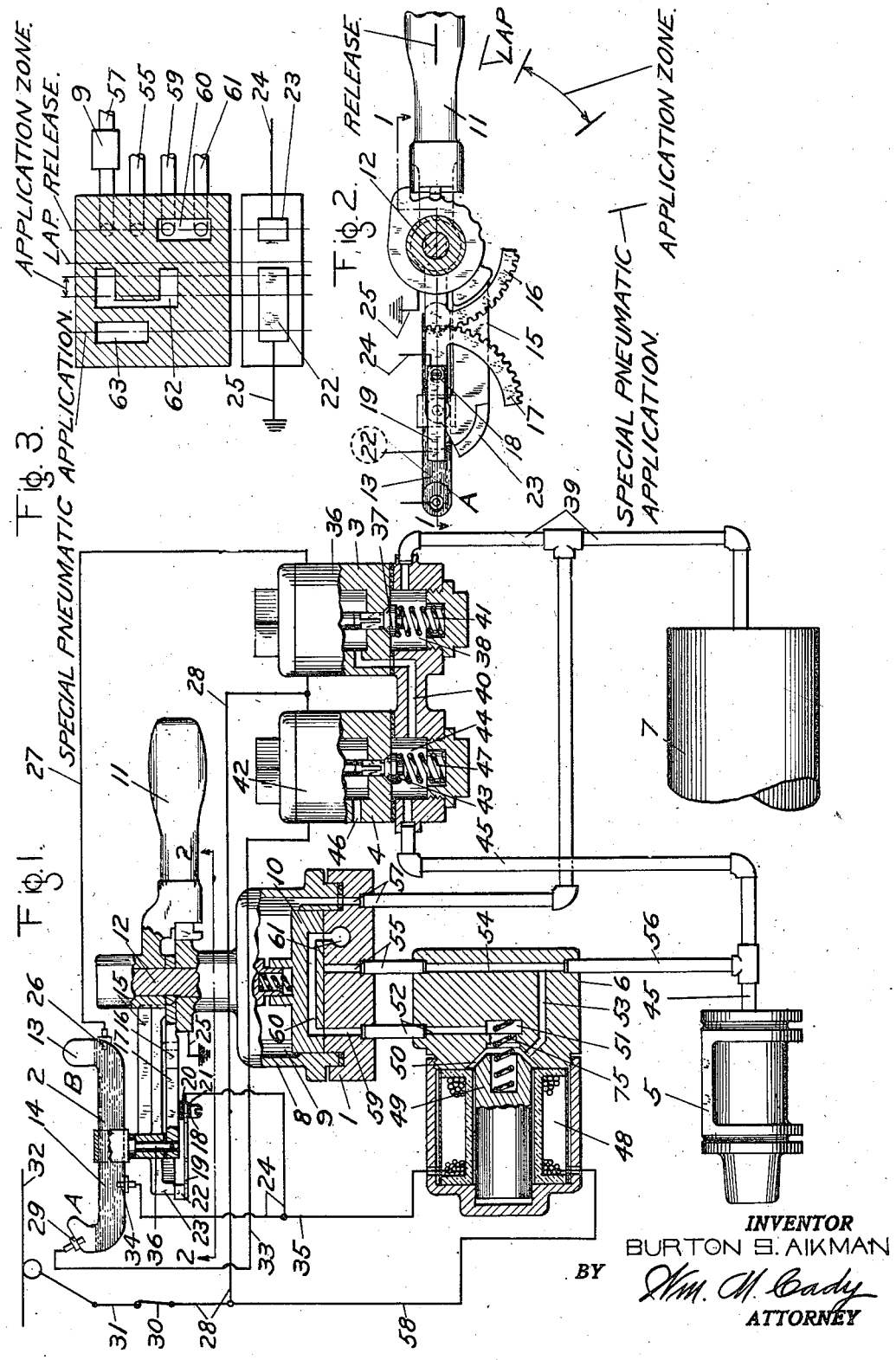
INVENTOR
BURTON S. AIKMAN
BY
Wm. M. Cady
ATTORNEY Patented Feb. 18, 1936

2,030,955

UNITED STATES PATENT OFFICE 2,030,955

BRAKE SYSTEM

Burton S. Aikman, Wilkinsburg, Pa., assignor to The Westinghouse Air Brake Company, Wilmerding, Pa., a corporation of Pennsylvania Application July 20, 1934, Serial No. 736,189

29 Claims. (Cl. 303—24)

This invention relates to electro-pneumatic brakes and has for its principal object to provide inertia controlled means for controlling the degree of brake application to such as will produce and substantially maintain a predetermined rate of retardation according to the position of the brake controlling device within an operating zone.

Other objects and advantages will appear from the following more detailed description of the invention.

In the accompanying drawing; Fig. 1 is a diagrammatic view, partly in section, of an electro-pneumatic brake equipment embodying the invention; Fig. 2 is a sectional view taken on the line 2—2 of Fig. 1; and Fig. 3 is a diagrammatic development of the brake valve device, showing the connections established in various operating positions of said device.

As shown in Fig. 1, the equipment may comprise a brake valve device 1, a retardation controller device 2 associated with said brake valve device, an application magnet valve device 3, a release magnet valve device 4, a brake cylinder 5, an interlock magnet valve device 6 and a main reservoir 7.

Referring to the drawing, the brake valve device may comprise a casing 8 having a valve chamber 9 containing the usual rotary valve 10 adapted to be operated by a handle 11 through the medium of a stem 12.

The brake valve device is provided with a release position, a lap position, an application zone in which, when operating electrically, the degree of application is automatically limited in accordance with the position of the operating handle, and in which the brakes are adapted to be applied pneumatically upon failure of the electric current supply, and a special pneumatic application position in which the brakes may be applied pneumatically upon failure of the application magnet, as will be understood from the description hereinafter.

For automatically limiting the degree of brake application effected by the brake valve device so as to limit the rate of retardation to a predetermined degree varying according to the operating position of said device, a retardation controller device 2 is provided, which may comprise a hermetically sealed tube 13 with upturned ends and containing a body of mercury 14, or other liquid which is a good conductor of electric current, normally extending part way up into the space at the upturned ends. Said tube is carried horizontally at the end of a shaft 36 rotatably mounted in a bracket 15 which extends from the casing 8 of the brake valve device 1, said tube being insulated from said shaft. According to the preferred form of construction, the tube 13 is made of some electrically insulating material, such for example, as glass, molded bakelite, hard rubber, or the like, which has smooth interior walls, so as to permit free movement of the body of liquid 14 contained in said tube.

For positioning the retardation controller device 2 according to the operating position of the brake valve device 1, a gear segment 16 is secured to the stem 12 and has teeth adapted to engage the teeth of a gear segment 17 secured to the shaft 36.

Fixed to the gear segment 17, in the present instance by means of a screw 18, is a contact member 19, which may be in the form of a metallic plate electrically insulated from said gear segment by means of an insulating member 20 and from said screw by means of an insulating washer 21 interposed between the head of said screw and the member 19. Carried by the contact member 19 is a contact 22 which is adapted to engage a contact 23 which may be formed on the bracket 15, when the operating handle 11 is turned to any position within the application zone. The contact member 19 is connected by a wire 24 to the retardation controller device and the contact 23 is grounded through the bracket 15, the casing 8 of the brake valve device and the ground wire 25.

Extending through the wall at one end of the tube 13 into the interior of said tube is a contact 26 which is connected by a wire 27 to one terminal of the application magnet valve device 3, the other terminal of said device being connected by a wire 28 to one terminal of a manually operated switch device 30, the other terminal of said switch device being connected by a wire 31 to a source of electric current supply, such as the trolley wire 32. Extending through the wall at the other end of said tube into the interior thereof is a contact 29 which is connected by a wire 33 to one terminal of the release magnet valve device 4, the other terminal of said device being connected to the wire 28. A contact 34 extends through the wall of the tube 13 into the interior thereof at a point where it is constantly submerged in the body of liquid and is connected by the wire 24 to the contact member 19 and to a wire 35 which leads to the interlock magnet valve device 6. The circuit from the contact 26 to the contact 34 and from the contact 29 to the contact 34 is adapted to be controlled by the body of liquid 14, as will be understood from the description hereinafter. The end of the tube containing the contact 29 will hereinafter be designated the A end and the end containing the contact 26 will hereinafter be designated the B end.

When the operating handle 11 is moved in a clockwise direction from release position, the tube 13 of the retardation controller device 2 is rotated in a counterclockwise direction, the angularity of the axis of said tube with reference to the longitudinal axis of the vehicle, or the direction of motion of the vehicle, increasing according to the degree of movement of said handle, but at no time during the movement of the handle within the service zone will said axis be disposed at right angles to the direction of motion, for a reason which will be explained hereinafter.

The disposition of the contact 26 with respect to the level of the body of liquid 14 in the tube 13 is such that when said tube has been rotated to a position corresponding to the right hand limit of the application zone, said contact is submerged to such a depth that the drop in the level of said body of liquid at the B end of the tube, due to the forward movement of said body under the action of the force of inertia as the speed of the vehicle decreases, will not be sufficient to uncover said contact and thereby open the circuit from the contact 26 to the contact 34 until and unless the rate of retardation exceeds a predetermined low degree. When the rate of retardation exceeds said predetermined low degree, then the level of the body of liquid at the B end of said tube will fall until the level is sufficiently low to uncover the contact 26 and thereby open the circuit from the contact 26 to the contact 34.

The contact 29 is so disposed with reference to the level of the body of liquid 14 that if the rate of retardation of the vehicle slightly exceeds the rate at which the forward movement of said body uncovers the contact 26, as above described, the resulting additional forward movement of said body of liquid will cause the contact 29 to become submerged in said liquid and the circuit from the contact 29 to the contact 34 will therefore be closed.

As the angularity of the tube 13 with reference to the direction of motion of the vehicle increases with the movement of the operating handle 11 in a clockwise direction from release position, a progressively higher rate of retardation is required to cause sufficient movement of the body of liquid 14 to open the circuit from contact 26 to contact 34 and to close the circuit from contact 29 to contact 34. This is because the force of inertia acting on said body of liquid and tending to move same forward from the B end of the tube 13 to the A end thereof, as the speed of the vehicle decreases, being a component of the force tending to move said body of liquid forward in the direction of motion of the vehicle, decreases as the angularity of said tube with respect to the direction of motion increases. As a result, as said angularity increases, a greater rate of retardation is required to obtain a component of sufficient magnitude to change the level of the body of liquid sufficiently to open the circuit at the contacts 26 and 34 and to close the circuit at the contacts 29 and 34. It will be understood that at no time during the movement of the handle 11 within the service zone is the tube 13 disposed at right angles to the direction of motion of the vehicle for the reason that in such a position of said tube, the above mentioned component of the force of inertia would be zero, and the retardation controller device would therefore be rendered ineffective.

The application magnet valve device 3 comprises a magnet 36 and a valve 37 adapted to be operated by said magnet. The valve 37 is contained in a valve chamber 38 which is connected to a pipe 39 leading to the main reservoir 7 and said valve controls communication from valve chamber 38 to a passage 40 leading to the release magnet valve device 4. A spring 41 acts to normally maintain the valve 37 seated.

The release magnet valve device 4 comprises a magnet 42 and a valve 43 adapted to be operated by said magnet. The valve 43 is contained in a valve chamber 44 which is open to passage 40 and which is connected to a pipe 45 leading to the brake cylinder 5, and said valve controls communication from valve chamber 44 to an atmospheric passage 46. A spring 47 acts on valve 43 for urging said valve to its seat.

The interlock magnet valve device comprises a magnet 48 and a valve 49 contained in a valve chamber 50 and adapted to be controlled by said magnet. Said valve controls communication from a chamber 51, which is connected by a passage and pipe 52 to the brake valve device, to a passage 53 which communicates with a passage 54 leading through a pipe 55 to the brake valve device and through a pipe 56 to the pipe 45. A spring 75 acts to unseat the valve 49 when the magnet 48 is deenergized. One terminal of said magnet is connected by a wire 58 to the wire 28 which, as hereinbefore mentioned, is connected to one terminal of the manually operated switch 30, while the other terminal of said magnet is connected by the wire 35 to the wire 24, which leads to the contact member 19 associated with the brake valve device 1.

In operation, fluid under pressure supplied to the main reservoir 7 flows through pipes 39 and 57 and passage 57 in the brake valve device 1 to the rotary valve chamber 9.

When the vehicle is at rest or is traveling at a constant rate of speed, the level of the body of liquid 14 in the tube 13 of the retardation controller device 2 is horizontal, as shown in Fig. 1.

With the handle 11 of the brake valve device 1 in release position, the contact 22 is disengaged from the contact 23, so that, assuming that the switch device 30 is in closed position, as shown in the drawing, the circuit to the magnet 48 of the interlock magnet valve device, which includes the supply wire 32, wire 31, the switch device 30, wires 28 and 58, the magnet 48, wires 35 and 24, contact member 19, contacts 22 and 23, the casing 8 of the brake valve device, and wire 25, is open at the contacts 22 and 23, so that the magnet 48 is maintained deenergized. With said magnet deenergized, the valve 49 is held unseated by the spring 75, so that the brake cylinder 5 is open to the atmosphere through pipes 45 and 56, passages 54 and 53, valve chamber 50, past the valve 49, thence through chamber 51, passage and pipe 52, passage 59 in the brake valve device, cavity 60 in the rotary valve 10, and the atmospheric passage 61.

If it is desired to effect an application of the brakes, the operating handle 11 is turned from release position to any position within the application zone, depending upon the degree of brake application desired, or the rate of retardation desired, as will be understood from the description hereinafter. This movement will cause the tube 13 of the retardation controller device 2 to be rotated in a counterclockwise direction from the position shown in Fig. 2, due to the meshing engagement of the gear segments 16 and 17, to a predetermined position corresponding to the position of the handle 11, the A end of said tube being forward and the B end thereof rearward.

With the handle 11 turned to a position in the application zone, the contact 22 is moved into engagement with the contact 23 so that the circuit to the application magnet 36 is closed, which circuit includes the supply wire 32, wire 31, the switch device 30, wire 28, the magnet 36, wire 27, contact 26, the body of liquid 14, contact 34, wire 24, contact member 19, contacts 22 and 23, the brake valve casing 8, and wire 25. The application magnet 36 is thus energized, so that the valve 37 is unseated. With the valve 37 unseated, fluid under pressure is supplied from the main reservoir 7 to the brake cylinder 5 through pipe 39, valve chamber 38, past the valve 37, passage 40, valve chamber 44 in the release magnet valve device 4, and pipe 45, thereby effecting an application of the brakes.

As the vehicle decelerates, the force of inertia will act upon the body of liquid 14 in the tube 13 to move it forward from the B end thereof toward the A end. The consequent change in the level of said body of liquid relative to the contacts 26 and 29, in any given rotational position of the tube 13, will depend upon the rate of retardation of the vehicle. If the rate of retardation exceeds a predetermined degree, the body of liquid will be moved forward in the tube until the level in the B end thereof falls below the contact 26, thereby opening the above mentioned circuit to the application magnet 36. The resulting deenergization of said magnet permits the valve 37 to be seated by the spring 41, thereby cutting off further supply of fluid under pressure to the brake cylinder.

As the speed of the vehicle reduces, the coefficient of friction between the brake shoes and the car wheels increases and the rate of retardation, and therefore the force of inertia acting on the body of liquid 14, increases. The increased force acting on the body of liquid will cause said body to move forward in the tube 13, thereby raising the level of the liquid in the A end thereof until the contact 29 is submerged. With said contact submerged, the magnet 42 of the release magnet valve device 4 is energized through a circuit which includes the supply wire 32, wire 31, the switch device 30, wire 28, the magnet 42, wire 33, contact 29, the body of liquid 14, contact 34, wire 24, contact member 19, contacts 22 and 23, the brake valve casing 8, and the ground wire 25. The energization of said magnet causes the valve 43 to be unseated, thereby permitting fluid to be released from the brake cylinder 5 through pipe 45, valve chamber 44, past the valve 43, and thence through the atmospheric passage 46.

When the braking force has thus been reduced to a degree where the rate of retardation is insufficient to maintain the level of the body of liquid 14 at the A end of the tube above the contact 29, the resulting drop in the level of the body of liquid 14 at said end of the tube will cause the above described circuit to the release magnet 42 to be opened. The resulting deenergization of said magnet permits the valve 43 to be seated by the action of the spring 47, thereby cutting off the venting of fluid from the brake cylinder, so that the brakes are lapped.

If the rate of retardation should again increase so that contact 29 is again submerged in the body of liquid 14, a further release of fluid under pressure from the brake cylinder will be effected. If, however, the first or any subsequent release of fluid pressure from the brake cylinder effects a rate of retardation such that the level of the body of liquid 14 will rise at the B end of the tube 13 until the contact 26 is again submerged, the application magnet 36 will again be energized and effect a further supply of fluid under pressure to the brake cylinder 5, until the rate of retardation has again been increased to a degree sufficient to cause the body of liquid to open the circuit at said contact.

Obviously, if fluid should leak from the brake cylinder sufficiently to cause a decrease in the rate of deceleration which will effect the submergence of the contact 26, fluid under pressure will again be supplied to the brake cylinder.

As hereinbefore explained, the angularity of the tube 13 with respect to the direction of motion of the vehicle increases as the operating handle 11 is moved in a clockwise direction through the application zone. Thus, for the reason hereinbefore set forth, the rate of retardation required to open the circuit to the application magnet 36 at the contact 26 and the rate of retardation required to close the circuit to the release magnet 42 at the contact 29 is dependent upon the position of the handle 11, a relatively slow rate of retardation being required when the handle is at the right hand limit of the application zone and a higher rate when the handle is in any position within the application zone beyond said limit, being greatest when the handle is at the left hand limit of said zone.

From the foregoing, it is apparent that when the operating handle 11 is moved to a position for effecting an electric application of the brakes, the retardation controller device 2 operates to control the supply of fluid under pressure to the brake cylinder and its release therefrom to a degree which will produce and substantially maintain a predetermined rate of retardation of the vehicle, varying according to the angularity of the tube 13 with respect to the direction of motion of the vehicle.

It is apparent that as the vehicle approaches a stop, the rate of retardation may be controlled by the manipulation of the operating handle 11, so that the vehicle may be brought to a stop smoothly.

To completely release the brakes, the operating handle 11 is returned to release position. This movement of the handle causes the contact member 19, and thereby the contact 22, to be rotated in a clockwise direction, so that said contact is moved out of engagement with the contact 23. With said contacts disengaged, the magnet 48 of the interlock magnet valve device 6 is deenergized and the valve 49 unseated, as hereinbefore described in connection with release position of the handle 11. The valve 49 being unseated, fluid under pressure is released from the brake cylinder 5 through pipes 45 and 56, passages 54 and 53, valve chamber 50, past the valve 49, chamber 51, passage and pipe 52, passage 59 in the brake valve device 1, cavity 60 in the rotary valve 10, and the atmospheric passage 61.

As hereinbefore explained and as shown in Fig. 3, when the operating handle 11 is moved into the application zone, the contact 22 is moved into engagement with contact 23. Due to this engagement, the magnet 48 of the interlock magnet valve device 6 is energized from the wire 28 through a circuit which includes the wire 58, the magnet 48, wires 35 and 24, contact member 19, contacts 22 and 23, the brake valve casing 8 and the ground wire 25. The magnet 48 being energized, the valve 49 is seated. It will be noted that with the handle 11 in the application zone, a port 62 in the rotary valve 10 of the brake valve device 1 connects passage 59, leading through pipe and passage 52 to chamber 51 in the interlock magnet valve device 6, with the rotary valve chamber 9, so that fluid under pressure is supplied from said rotary valve chamber to chamber 51. The valve 49 being seated, however, fluid under pressure in chamber 51 is prevented from flowing therefrom past said valve into passage 53 and thence through passage 54, and pipes 56 and 45 to the brake cylinder 5.

If, with the handle 11 in the application zone, the supply of electric current should fail for any reason, the application magnet valve device 3 will be rendered inoperative to supply fluid under pressure to the brake cylinder, but the brakes will automatically be applied pneumatically because, due to the failure of the electric current supply, the magnet 48 of the interlock magnet valve device 6 will become deenergized and permit the valve 49 to become unseated by the pressure of the spring 75 and of the fluid in chamber 57. With said valve unseated, fluid under pressure supplied to chamber 51 from the rotary valve chamber 9 flows therefrom to the brake cylinder through passages 53 and 54 and pipes 56 and 45, thereby effecting an application of the brakes. Obviously, with the supply of electric current cut off, the retardation controller device 2 is inoperative to control the retardation of the vehicle.

To release the brakes following an application effected pneumatically as above described, the operating handle 11 is turned to release position and fluid under pressure is thereupon released from the brake cylinder 5 through the interlock magnet valve device 6 and the brake valve device in the same manner as hereinbefore described in connection with a release of the brakes following an application effected electrically. The brakes will thereafter be controlled pneumatically in the usual manner until the supply of electric current is restored.

Should the application magnet 36 fail to operate when the operating handle 11 is moved into the application zone for effecting an electric brake application, the valve 37 will not be unseated to supply fluid under pressure to the brake cylinder. In this event, the operator will turn the handle 11 to the special pneumatic application position, in which fluid under pressure is supplied from the rotary valve chamber 9 of the brake valve device 1 to the brake cylinder 5 through a port 63 in the rotary valve 10, passage and pipe 55, passage 54 in the interlock magnet valve device 6, and pipes 56 and 45.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of means operative electrically for supplying fluid under pressure to the brake cylinder, manually operable means controlling a communication through which fluid under pressure is supplied to the brake cylinder and for effecting the operation of said electrically controlled means, and means effective upon energization of said electrically controlled means to cut off the flow of fluid under pressure through said communication.

2. In a fluid pressure brake, the combination with electrically controlled means for supplying fluid under pressure to effect an application of the brakes, of manually operable means operative to supply fluid under pressure to effect an application of the brakes and to effect the operation of said electrically controlled means, and means effective upon energization of said electrically controlled means for cutting off communication through which said manually operable means supplies fluid under pressure.

3. In a fluid pressure brake, the combination with a brake cylinder and a pipe through which fluid under pressure is adapted to be supplied to said brake cylinder, of means operative electrically to supply fluid under pressure to said brake cylinder, manually controlled means operative to effect operation of said electrically operative means and to simultaneously supply fluid under pressure to said pipe, and means energized upon energization of said means operative electrically for rendering said manually operated means ineffective to supply fluid under pressure to said pipe so long as the means operative electrically remains energized.

4. In a fluid pressure brake, the combination with a brake cylinder and a pipe through which fluid under pressure is adapted to be supplied to said brake cylinder, of means operative electrically to supply fluid under pressure to said brake cylinder, manually controlled means operative to effect operation of said electrically operative means and to simultaneously supply fluid under pressure to said pipe, and means operative upon the operation of said manually operated means for rendering said manually operated means ineffective to supply fluid under pressure to said pipe so long as the means operative electrically remains operative.

5. In a fluid pressure brake, the combination with a brake cylinder and a pipe through which fluid under pressure is adapted to be supplied to said brake cylinder, of means operative electrically to supply fluid under pressure to said brake cylinder, manually controlled means operative to effect operation of said electrically operative means and to simultaneously supply fluid under pressure to said pipe, and electrically controlled means adapted to be energized upon the movement of said manually operated means for rendering said manually operated means ineffective to supply fluid under pressure to said pipe so long as the means operative electrically remains operative.

6. In an electro-pneumatic brake, the combination with a brake cylinder and a pipe through which fluid under pressure is adapted to be supplied to said brake cylinder, of electrically controlled means for supplying fluid under pressure to said brake cylinder, a manually operated brake switch device for controlling the operation of said electrically controlled means, a valve operative to effect the supply of fluid under pressure to said pipe upon movement of said brake switch device to a position for effecting operation of said electrically controlled means, and means operative to render said valve ineffective to supply fluid under pressure to said pipe so long as the electrically controlled means remains operative.

7. In a fluid pressure brake, the combination with a brake cylinder and a pipe through which fluid under pressure is adapted to be supplied to said brake cylinder, of means operative electrically to supply fluid under pressure to said brake cylinder, manually operated means having a position for effecting operation of said electrically operative means and for simultaneously supplying fluid under pressure to said pipe and having another position for supplying fluid under pressure to said pipe, and means for rendering said manually operated means ineffective to supply fluid under pressure to said pipe in the first mentioned position so long as the electrically controlled means remains operative.

8. In a fluid pressure brake, the combination with a brake cylinder and a pipe through which fluid under pressure is adapted to be supplied to said brake cylinder, of means operative electrically to supply fluid under pressure to said brake cylinder, manually operated means having a position for effecting operation of said electrically operative means and for simultaneously supplying fluid under pressure to said pipe and having another position for supplying fluid under pressure to said pipe, and electrically controlled means adapted to be energized upon the movement of said manually operated means to the first mentioned position for rendering said manually operated means ineffective to supply fluid under pressure to said pipe in said position so long as the electrically controlled means remains operative.

9. In a vehicle brake apparatus, the combination with means for effecting an application of the brakes, of a control device comprising a mobile body movable at all times in a horizontal direction upon a change in the rate of speed of the vehicle for controlling the operation of said means, and means for varying the angularity of the direction of motion of said body with respect to the direction of motion of the vehicle whereby said body controls said means to effect a degree of brake application which will produce and substantially maintain a predetermined rate of retardation of the vehicle, varying according to said angularity.

10. In a vehicle brake apparatus, the combination with means for effecting an application of the brakes by fluid under pressure, of a device operable according to the rate of retardation of the vehicle for controlling the supply of fluid under pressure to effect an application of the brakes, means for supplying fluid under pressure to effect an application of the brakes until said device operates at a predetermined rate of retardation to cut off the further supply of fluid under pressure, said device including a mobile body movable by inertia in a horizontal direction, and means for varying the angularity of the direction of motion of said body with respect to the direction of motion of the vehicle for varying the rate of retardation of the vehicle.

11. In a vehicle brake apparatus, the combination with means for effecting an application of the brakes by fluid under pressure, of a device operable at a predetermined rate of retardation for cutting off the supply of fluid under pressure, means for continuing the supply of fluid under pressure until said device operates to cut off the supply of fluid under pressure, said device including a mobile body movable by inertia in a horizontal direction, and means for varying the angularity of the direction of motion of said body with respect to the direction of motion of the vehicle for varying the point at which said device cuts off the supply of fluid under pressure.

12. In a vehicle brake apparatus, the combination with a brake cylinder, of a device operable according to the rate of retardation of the vehicle for controlling the supply of fluid under pressure to said brake cylinder to effect an application of the brakes, means for supplying fluid under pressure to said brake cylinder to effect an application of the brakes until said device operates at a predetermined rate of retardation to cut off the supply of fluid under pressure to said brake cylinder, said device including a mobile body movable by inertia in a horizontal direction, and means for varying the angularity of the direction of motion of said body with respect to the direction of motion of the vehicle for varying the rate of retardation of the vehicle.

13. In a vehicle brake apparatus, the combination with a brake cylinder, of electrically controlled means operative upon energization to supply fluid under pressure to said brake cylinder to effect an application of the brakes and operative upon deenergization to cut off the supply of fluid under pressure to said brake cylinder, a control device for controlling the operation of said means and operable to maintain said means energized until the rate of retardation has increased to a predetermined degree whereupon said device operates to effect deenergization of said means, said device comprising a mobile body movable by inertia in a horizontal direction, and means for varying the angularity of the direction of motion of said body with respect to the direction of motion of the vehicle for varying the rate of retardation of the vehicle.

14. In a vehicle brake apparatus, the combination with electrically controlled means for applying the brakes, of an inertia device comprising a body of liquid, contacts associated with said means and controlled by said body of liquid according to the movement thereof as effected by a change in the rate of speed of the vehicle, and means for varying the angularity of the direction of movement of said body of liquid with respect to the direction of motion of the vehicle.

15. In a vehicle brake apparatus, the combination with means for effecting an application of the brakes, of a control device comprising a mobile body movable at all times in a horizontal direction upon a change in the rate of speed of the vehicle for controlling the operation of said means, and means for varying the angularity of the direction of motion of said body with respect to the direction of motion of the vehicle whereby said body controls said means to limit the brake application to a degree which will provide a predetermined rate of retardation of the vehicle varying according to said angularity.

16. In a vehicle brake apparatus, the combination with means for applying the brakes, of a control device comprising a mobile body adapted to move at all times in a horizontal direction upon a change in the rate of speed of the vehicle, means controlled by movement of said body for controlling the first mentioned means, and means for varying the angularity of the direction of motion of said body with respect to the direction of motion of the vehicle for varying the operation of the first mentioned means.

17. In a vehicle brake apparatus, the combination with means for applying the brakes, of a control device comprising a mobile body adapted to move at all times in a horizontal direction upon a change in the rate of speed of the vehicle, means controlled by movement of said body for controlling the first mentioned means, and manually operated means for varying the angularity of the direction of the motion of said body with respect to the direction of motion of the vehicle for varying the operation of the first mentioned means.

18. In a vehicle brake, the combination with means for applying the brakes, of a control device comprising spaced contacts in a circuit to said means, a mobile body adapted to move at all times in a horizontal direction upon a change in the rate of speed of the vehicle for engaging said contacts, and means for varying the angularity of the direction of motion of said body with respect to the direction of motion of the vehicle for varying the operation of the first mentioned means.

19. In a vehicle brake apparatus, the combination with a brake cylinder, of means operative to control the supply of fluid under pressure to said brake cylinder, a control device comprising a mobile body adapted to constantly move in a horizontal direction upon a change in the rate of speed of the vehicle for controlling the operation of said means, and means for varying the angularity of the direction of motion of said body with respect to the direction of motion of the vehicle for varying the operation of the first mentioned means.

20. In a vehicle brake apparatus, the combination with a brake cylinder, of means operative to control the release of fluid under pressure from said brake cylinder, a control device comprising a mobile body adapted to constantly move in a horizontal direction upon a change in the rate of speed of the vehicle for controlling the operation of said means, and means for varying the angularity of the direction of motion of said body with respect to the direction of motion of the vehicle for varying the operation of the first mentioned means.

21. In a vehicle brake apparatus, the combination with a brake cylinder, of means for controlling the supply of fluid under pressure to and release of fluid under pressure from said brake cylinder, a mobile body adapted to be moved at all times in a horizontal direction by the force of inertia for controlling the operation of said means, and means for varying the angularity of the direction of motion of said body with respect to the direction of motion of the vehicle for varying the operation of the first mentioned means.

22. In a vehicle brake apparatus, the combination with a brake cylinder, of electroresponsive means for controlling the supply of fluid under pressure to and release of fluid under pressure from said brake cylinder, a mobile body adapted to be moved at all times in a horizontal direction by the force of inertia for controlling the operation of said electroresponsive means, and means for varying the angularity of the direction of motion of said body with respect to the direction of motion of the vehicle for varying the operation of said electroresponsive means.

23. In a vehicle brake apparatus, the combination with electroresponsive means operative to control the application and release of the brakes, of control means for governing the operation of said electroresponsive means comprising a mobile body having a normal position for effecting an application of the brakes and movable at all times in a horizontal direction according to the rate of retardation of the vehicle first to a lap position and then to a brake releasing position, switch means for rendering said control means effective to control said electroresponsive means, and means for varying the angularity of the direction of motion of said body with respect to the direction of motion of the vehicle for varying the operation of said electroresponsive means.

24. In a vehicle brake apparatus, the combination with manually movable means operative to effect an application of the brakes according to the degree initially desired, of a mobile body controlled by said means for varying the degree of said brake application so as to limit the rate of retardation of the vehicle to a predetermined degree, said body being urged by the force of inertia in the direction of motion of the vehicle and constrained to travel in a horizontal direction at an angle to said direction of motion according to the degree of movement of said manually movable means.

25. In a vehicle brake apparatus, the combination with manually movable means operative to effect an application of the brakes according to the degree initially desired, of a mobile body controlled by said means for varying the degree of said brake application so as to limit the rate of retardation of the vehicle to a predetermined degree, said body being movable in a horizontal direction varying according to the degree of movement of said manually movable means.

26. In a vehicle brake apparatus, the combination with a manually operated brake controlling device for effecting an application of the brakes according to the degree initially desired, of an inertia device comprising a body of liquid, and means controlled by said body of liquid according to the movement thereof for varying the degree of application effected by said brake controlling device so as to limit the rate of retardation of the vehicle to a predetermined degree.

27. In a vehicle brake apparatus, the combination with a brake cylinder, of means for initially effecting a supply of fluid under pressure to said brake cylinder, and a retardation controller device comprising a body of liquid for controlling said means and having a position for rendering said means effective, said device being operable to render said means ineffective upon a predetermined movement of said body of liquid as effected by a change in the rate of speed of the vehicle and to maintain said means ineffective until said body of liquid has returned to said position.

28. In a vehicle brake apparatus, the combination with a brake cylinder, an application magnet valve device operative upon energization to effect a supply of fluid under pressure to said brake cylinder, a release magnet valve device operative upon energization to effect a release of fluid under pressure from said brake cylinder, and contacts associated with said devices, of a retardation controller device comprising a body of liquid for controlling said contacts, said body of liquid having a position for submerging said contacts associated with said application magnet valve device for effecting the energization of said device and being movable to another position upon the retardation of the vehicle at one rate for disconnecting said contacts associated with said application magnet valve device, said body of liquid being movable to another position upon a rate of retardation greater than said rate for submerging said contacts associated with said release magnet valve device for effecting energization of said device and maintaining said contacts associated with said application magnet valve device disconnected.

29. In a vehicle brake apparatus, the combination with means for applying the brakes, of an inertia device comprising a mobile body movable at all times in a horizontal direction for controlling the operation of said means, means for varying the angularity of the direction of motion of said body with respect to the direction of motion of the vehicle for varying the operation of said means, and means for manually controlling the application of the brakes in the event that said inertia device is ineffective.

BURTON S. AIKMAN.